United States Patent [19]
Sims et al.

[11] Patent Number: 5,659,133
[45] Date of Patent: Aug. 19, 1997

[54] HIGH-TEMPERATURE OPTICAL COMBUSTION CHAMBER SENSOR

[75] Inventors: Paul E. Sims, Wilmington; James B. McNeely, Newark, both of Del.

[73] Assignee: Astropower, Inc., Newark, Del.

[21] Appl. No.: 637,325

[22] Filed: Apr. 22, 1996

[51] Int. Cl.⁶ ................................................ G01M 15/00
[52] U.S. Cl. .................... 73/116; 73/35.07; 73/35.14; 73/35.16; 356/43; 313/323
[58] Field of Search ........................ 73/116, 117.2, 73/117.3, 35.07, 35.14, 35.16; 356/43, 44, 45, 333, 219; 385/147; 313/323

[56] References Cited

U.S. PATENT DOCUMENTS

| | | | |
|---|---|---|---|
| 3,978,720 | 9/1976 | Ford | 73/116 |
| 4,313,344 | 2/1982 | Brogardh et al. | 356/44 |
| 4,413,509 | 11/1983 | Moser et al. | 73/117.3 |
| 4,441,021 | 4/1984 | Olson et al. | 73/117.3 |
| 4,444,043 | 4/1984 | Hattori et al. | 73/116 |
| 4,468,949 | 9/1984 | Linder et al. | 73/35.07 |
| 4,484,469 | 11/1984 | Grover et al. | 73/117.3 |
| 4,643,022 | 2/1987 | Werlberger et al. | 73/117.3 |
| 4,657,386 | 4/1987 | Suarez-Gonzalez et al. | 356/45 |
| 4,681,434 | 7/1987 | Kepple | 356/45 |
| 4,692,025 | 9/1987 | Tani et al. | 356/45 |
| 4,919,099 | 4/1990 | Extance et al. | 73/35.07 |
| 5,067,463 | 11/1991 | Remboski et al. | 73/35.07 |
| 5,099,681 | 3/1992 | Dils | 73/35.07 |
| 5,125,381 | 6/1992 | Nutton et al. | 73/116 |
| 5,349,850 | 9/1994 | Young | 73/116 |
| 5,467,185 | 11/1995 | Engeler et al. | 356/44 |
| 5,507,576 | 4/1996 | Fally | 356/45 |
| 5,565,990 | 10/1996 | Hosoi et al. | 356/45 |

*Primary Examiner*—George M. Dombroske
*Attorney, Agent, or Firm*—Connolly & Hutz

[57] ABSTRACT

The disclosure describes a high-temperature optical transducer capable of acquiring input variables for closed-loop control of combustion systems. The key components of the innovation are a high-temperature, embedded photodiode, the use of low-cost, integral absorption filters; and the use of an embedded high-temperature preamplifier circuit. These components are combined in an optical-to-electrical signal transducer deployed in the high-temperature combustion environment, thus avoiding the high costs of optical signal transmission. The optical signals to the transducer are employed to recognize events in real-time such as the ignition spark, the start of combustion, end of combustion, misfires, and knocking. The outputs from the transducer may be used in a statistical fashion to control engine roughness and cyclic stability. By resolving specific colors in the flame, the optical sensors may also be used to determine the temperature and the emission production in the combustion chamber.

17 Claims, 5 Drawing Sheets

HIGH-TEMPERATURE OPTICAL COMBUSTION CHAMBER SENSOR

BACKGROUND OF THE INVENTION

1. Field of Invention

The invention relates to a method and an article of manufacture that employs a high temperature optical transducer to transform light signals arising from illumination during the combustion cycle into discrete electronic signals, and thus accomplish the acquisition of control variables for closed-loop control of combustion power systems.

2. Description of Related Art

The invention relates to a high-temperature optical transducer to accomplish the acquisition of input variables for closed-loop control of combustion systems. Signals from an optical transducer element can be used in a feedback loop to improve engine performance in terms of cyclic stability, knock, combustion timing, and in-cylinder temperature/$NO_x$ control. Optical signals may be used to recognize events such as the ignition spark, the start of combustion, and the end of combustion. Engine roughness, misfires, and knocking can be detected by high-speed, real-time optical methods. Signals from optical transducers may be used in a statistical fashion to control engine roughness and cyclic stability. By resolving specific colors in the flame, optical sensors may be used to determine the temperature and the emission production in the combustion chamber.

U.S. Pat. No. 3,978,720 discloses a device for detecting combustion within a cylinder of an internal combustion engine by sensing the visible and/or infra-red radiation emitted during combustion by means of a quartz window in the cylinder wall or head, a fiber-optic light guide and a phototransistor.

Optical combustion sensors can be used to acquire time-resolved combustion process parameters in a cyclical sequence such as the internal combustion engine. Crank angle and time delay between the initiation of spark and the start of combustion, maximum pressure in combustion and end of combustion can be determined from the optical signal. In a similar fashion, the time-domain parameters can be extracted in a compression ignition process by optical measurement. U.S. Pat. No. 4,381,748 discloses a method for regulating the combustion of operating mixtures in the combustion chambers of internal combustion engines. The intensity of the light resulting from combustion is detected and evaluated over the course of combustion; time-domain reference control variables such as turning points of the light intensity curve, the maximum of the light intensity curve, and the point where the light intensity curve increases are derived. The control signals obtained are an expression of the combustion chamber status in terms of pressure and temperature. U.S. Pat. No. 4,919,099 discloses a method of monitoring combustion within a cylinder of a reciprocating piston internal combustion engine by deriving first and second electrical signals representative of light intensity within the cylinder by means of optical transducers of spaced spectral response at common or closely adjacent locations and establishing a signal representing the ratio of the first and second electrical signals used as a control parameter for an engine control system.

U.S. Pat. No. 4,930,478 discloses an internal combustion engine having a luminosity probe and an arrangement for adjusting the running parameters of the engine to obtain the desired luminosity. Also disclosed in U.S. Pat. No. 4,930,478 is an arrangement for maintaining uniformity from cycle to cycle in a given combustion chamber and uniformity of combustion in the combustion chambers of a multi-chamber engine. U.S. Pat. No. 5,113,828 discloses an extension of the forgoing based on particular gain-independent parameters of the luminosity signal. Gain-independent (i.e. time-domain rather than intensity) luminosity parameters can be used to obtain uniform combustion conditions from cycle to cycle in a given combustion chamber and uniform combustion in the combustion chambers of multi-chamber engine. U.S. Pat. No. 5,103,789 also extends on the forgoing and discloses an arrangement for measuring and controlling combustion phasing based on the location of particular gain-independent parameters of the luminosity signal.

Time resolved optical signals may be used to determine the occurrence of a misfire event in an internal combustion engine. U.S. Pat. No. 5,125,381 discloses such an engine misfire detector comprised of an optoelectric sensor for monitoring light produced by combustion inside a cylinder. The sensor is connected to a variable gain amplifier; and the output of the gain control circuit is compared to a threshold using a comparator to provide a misfire detection signal.

Lean burn operation of an internal combustion engine reduces the combustion temperature, and thus the production of $NO_x$, but results in an increase in the instability of the combustion and an increase in knocking. Optical signals from the combustion event can be used to determine the occurrence of predetonation and the engine operating parameters. Knocking can be detected by a differential analysis of the optical signal before the onset of knock, whereas pressure transducers can only detect knock after it occurs. U.S. Pat. No. 4,358,952 discloses a sensor system to detect detonations in an internal combustion engine constructed as a unit that may be threadedly (sic) engaged with the combustion chamber wall. U.S. Pat. No. 4,381,748 discloses that detection of light emission is well suited to early recognition of knocking combustion and its consequent prevention by means of a suitable regulatory intervention. U.S. Pat. No. 4,919,099 discloses the use of detectable and recognizable differences in the light intensity signal to determine the occurrence of knock in the combustion process.

An optical transducer can be utilized for the real time determination of the excess air ratio ($\lambda$) or the fuel/air equivalence ratio ($\phi$) by the acquisition of spectrally resolved intensity information that is correlated to the chemiluminescence of combustion product radicals. Use of this information can be used to form a closed-loop control algorithm where the internal combustion engine can be operated in a lean condition near the knock limit, reducing the actual level of pollutants emitted, or the air-fuel ratio can be maintained in a narrow range near the stoichiometric air-fuel ratio where so-called "three-way" catalytic converters operate most efficiently. The present oxygen sensor used in automobiles is comprised of an electrochemical cell in the exhaust stream. There is no proportional response in this device (it operates in "on-off" mode) and the control system is typically open-loop in nature.

U.S. Pat. No. 4,358,952 discloses an embodiment of this nature with the fundamental features of at least one filter disc disposed in front of the detector so that selective processing of the received optical signals is possible; if several individual filters having different selectivity are used, differentiation of various radiation bands for example HC, CO, OH is achieved.

Ohyama, et al. [1990] report on an internal combustion control system that utilizes a 1 mm diameter fiber optic probe which extends through the center of a spark plug. The CH and $C_2$ radicals are associated with the 431 nm and 517 nm wavelengths of light and can be correlated to the excess air ratio ($\lambda$). In this work, predetonation (knocking) was detectable by the analysis of pressure and optical data. Sohma, et al. [1991] report that the ratio between 431 nm and 517 nm wavelength flame emission can be used to calculate the excess air ratio and that two color pyrometry can be used to estimate the flame temperature in a combustion chamber at a data collection rate of 50 kHz. These results indicate that the air/fuel mixture can be determined accurately for $\lambda$=0.8 to 1.5. Sohma et al. [1991] found that the flame temperature is well correlated to engine knocking. The optical sensor utilized in these two reports was a photomultiplier tube. This type of detector is not practical for a production engine control system due to the high voltages required and the relatively high cost of this kind of instrumentation. These forgoing results are disclosed in U.S. Pat. Nos. 4,444,169, 5,186,146, and Re. 34,211.

U.S. Pat. Nos. 5,067,463 and 5,099,683 disclose that an internal combustion engine having a luminosity detector and an arrangement for measuring certain operating and running parameters such as peak heat release rate in the combustion chamber, $NO_x$ emissions and air/fuel ratio is provided. An arrangement is also disclosed wherein the engine's adjustable parameters can be varied in response to the luminosity signal or in response to other measured operating parameters so as to provide better running of the engine and or reduce cycle to cycle variations.

The optical signal due to a combustion process may be used to determine flame temperature. U.S. Pat. Nos. 4,444, 169 and 5,186,146 disclose that flame temperature is calculated using the ratio of electrical signal outputs from photoelectric conversion elements based on an optical signal obtained from thermal radiation having wavelengths including none of the wavelengths of an optical signal obtained from radical emission. U.S. Pat. No. 5,467,185 discloses that respective SiC (silicon carbide) photodiode sensors are used to measure flame temperature at each cylinder of an internal combustion engine, and information generated by the SiC photodiode sensors is used to control the fuel injection in a feedback loop to adjust individual cylinder flame temperature and combustion parameters.

U.S. Pat. No. 4,468,949 discloses an apparatus for detecting operating characteristics of an internal combustion engine. It has an optical sensor whose output signal is delivered to an amplifier with a variable transmission behavior. As a result, it is possible to have either a stepped or a continuous adaptation of the sensor sensitivity to various operational points of the engine. It is particularly proposed that the amplification for the measurement signal be selected to be high in the case of an optoelectronic combustion chamber observation in a low load range, while it is selected to be low in a high load range, so that relatively equalized measurement results are available.

U.S. Pat. No. 4,940,033 discloses an internal combustion engine having a luminosity probe and an arrangement for measuring certain parameters such as combustion chamber pressure, heat release and the like by measuring luminosity in the chamber and adjusting the running parameters of the engine to obtain the desired luminosity. Also disclosed is an arrangement for maintaining uniformity from cycle to cycle in a given combustion chamber and uniformity combustion in the combustion chambers of a multi-cylinder engine.

U.S. Pat. No. 4,891,970 discloses a luminosity and temperature detector for an internal combustion engine and method for measuring luminosity including a light probe and photodiode that receives the light transmitted from the light probe. The photodiode is designed, constructed, and biased to operate within the zero temperature coefficient portion of its range for the wavelengths being measured. In addition, the dark current is measured when there is no luminosity due to combustion and this is subtracted from the other readings to obtain temperature compensation. Furthermore, the dark current measurement will indicate the temperature of the photodiode. The responsivity and dark current of a photodiode change with temperature. These disclosures do not appear to be correct in all details to one skilled in the art. In particular, while variations in dark current are a well-known measure of junction temperature, the "zero temperature coefficient portion" of a silicon photodiode's response curve has existance only over a limited temperature range and the subtraction of the dark current from the light-generated current in a photodiode will not result in an output signal that is independent of the temperature variations in operation.

The foregoing disclosures indicate that the characterization and active control of the combustion process using optical signals is technically feasible through many different forms and implementations, but the optical control systems with the hardware and apparatus used to date are prohibitively expensive. A device that has the following three attributes is required to implement the control methods disclosed above: 1) the device must be able to convert the optical signals due to the combustion event to electrical signals which can be transmitted to a control module, 2) the device must have a configuration and manufacture such that the employment of said device is practical for a production engine, and 3) the device must have a reasonably long operational lifetime in such a production engine.

SUMMARY OF INVENTION

The key innovation of this invention is the disclosure of an embodiment of an optical transducer that has these three attributes such that deployment of the device in a mass market is feasible. The key components of the invention are the use of high-temperature, embedded photodiodes; the use of low-cost, integral absorption filters; and the use of an embedded high-temperature preamplifier circuit.

The critical component of the invention is the selection of a material for the fabrication of a high-temperature photodiode. One of the major contributors to system cost is the utilization of fiber-optic elements to transmit the light signals acquired from the combustion process to a central module that converts the optical information to electrical signals. To avoid this cost, it is necessary to mount the optical conversion element in close proximity to the combustion chamber where the flame signal is acquired so that electrical signals can be further transmitted to the engine control module. Some of the disclosures cited above have mentioned the possibility of using a high-temperature optoelectronic element which is mounted in close proximity to the combustion event but the technologies cited, with the exception of U.S. Pat. No. 5,467,185, require that the optoelectronic element be cooled to below 100° C. for operational feasibility. Table 1, complied from the works of Heywood [1988], Erskine, et al. [1994], Charles and Clatterbaugh [1994] and He, et al. [1993], displays typical maximum operating temperatures that an optoelectronic device will be subjected to during operation for different positions in an automobile engine compartment.

TABLE 1

Automobile Environments - operating temperatures

| Location | High Temperature (°C.) |
| --- | --- |
| Choke | 205 |
| Intake Manifold | 115 |
| Catalytic Converter | 650 |
| In Spark Plug | <200 |
| Valves | >700 |
| Firewall | 145 |

The detectivity (D*) of a photodiode may be calculated as a function of the semiconductor material bandgap and the device operating temperature by one skilled in the art. A simplistic analysis yields two descriptive relationships; first, $$D_\lambda^* = \frac{q\eta\lambda \sqrt{\frac{kTA}{qI_{sat}}}}{2hc\sqrt{kT}}$$

where $D^*_\lambda$ is the detectivity at wavelength $\lambda$, q is the electronic charge, $\eta$ is the quantum efficiency of the device at wavelength $\lambda$, k is Boltzmann's constant, T is the absolute temperature, A is the area of the device, $I_{sat}$ is the reverse saturation current of the device, h is Planck's constant, and c is the speed of light in a vacuum [Long, 1977]. Secondly, the value of $I_{sat}$ has a strong dependence on temperature and bandgap, and the quantity $$\frac{kT}{qI_{sat}} \approx R_{sh}$$

through Ohm's law is recognized as an estimate of the device shunt resistance, $R_{sh}$, which can be measured directly, and replaced in the first equation.

For photodiodes which are intended to measure the intensity of low-light levels, a direct measurement of the shunt resistance is preferred since there are non-analytical processes contributing to the actual value of the shunt resistance in a real device. There is a strong empirical relationship between the difficulty of forming photodiodes with high shunt resistance and the corresponding (high) bandgap of the semiconductor material from which the photodiode is fabricated.

FIG. 1 displays measured values of shunt resistance for typical silicon and gallium phosphide photodiodes as a function of temperature. FIG. 2 displays measured and calculated values of the reverse saturation current density ($I_{sat}$/A) as a function of temperature for silicon, gallium arsenide, and gallium phosphide semiconductor materials. For a signal due to an optical process to be acquired and converted to a useful electric signal the amount of light-generated current in the photodiode at a given temperature must be larger than the magnitude of the lessor of the leakage current in the photodiode or the shunt resistance of the photodiode at the same temperature.

The proper bandgap of the material for the photodiode requires consideration of the wavelength at which the onset of optical absorption occurs, and the dark or leakage current through a diode fabricated from the material of that bandgap, which determines the maximum operating temperature of the photodiode device. The invention requires a material with bandgap in the range of 2.1 to 2.5 eV that is optimal for a photodiode positioned close to the combustion flame in an internal combustion engine and where the photodiode is in a thermal environment that, with the exception of the engine warm-up and light-off process, is between 100° C. and 300° C. A semiconductor material with a lower bandgap will require exponentially more optically-induced current to acquire a usable signal due to the temperature dependence of reverse saturation current and shunt resistance; and a semiconductor material with a higher bandgap will have no response to light emission from the $C_2$ radicals in the flame spectra with a wavelength of 517 nm and the main CH radical with a wavelength of 431.4 nm due to the correspondence between semiconductor material bandgap, the onset of light absorption, and the subsequent generation of light induced electron-hole pairs. Based on these and related considerations, gallium phosphide is a preferred material. It has a bandgap of 2.26 eV corresponding to the onset of long wavelength response at about 550 nm, a maximum response near 450 nm and a short wave cutoff of about 300 nm. Other materials satisfying the criteria include, but are not limited to, 3-C SiC, CdS, and specific compositions of InCaN and AlInGaN.

Although the silicon carbide device will clearly function in the temperature range of 100° C. to 300° C. a hexagonal silicon carbide photodiode device comprised of the 6-H or 4-H polytype will not respond to optical signals at wavelengths longer than 414 nm for the 6-H polytype and 381 nm for the 4-H polytype. It is clear to one skilled in the art from the disclosure in U.S. Pat. No. 5,186,146 that the 3-C polytype of silicon carbide and the over 200 hexagonal polytypes other than the 6-H and 4-H polytypes of silicon carbide are not specifically included in the claims in U.S. Pat. No. 5,186,146 (c.f. Claim No. 17 and Claim No. 26). It is noted that the 3-C polytype of silicon carbide and a particular composition of AlInGaN can be produced in a practical manner with a bandgap at or near the optimal bandgap of 2.26 eV that is characteristic of gallium phosphide.

The semiconductor device requirements detailed above, leading to the identification of, among other materials, gallium phosphide, enable a low-cost manufacture and implementation of an optical combustion sensor which is capable of determining luminosity and time-domain parameters of the combustion process while operating at a temperature typical of those expected in the engine compartment of a production automobile.

The electronic signals produced by a high-temperature photodiode in response to the filtered light spectra of a combustion flame are not in general of sufficient magnitude to be connected to the input stage of a signal processing device that is operating at a lower temperature without considerable distortion to the electrical information during transmission. A preamplifier element that is located in close proximity to the photodiode elements (and so is at a high temperature) is required to boost the electronic signal to a value sufficient for distortion free transmission to the receiving signal processing module. One embodiment of this apparatus would be the use of a silicon-on-insulator integrated circuit technology to construct the required preamplifier circuit.

An optical system for engine control will provide significant improvements in engine performance characteristics. An embedded gallium phosphide (GAP) based optical sensor in the combustion chamber enables a high-speed, real-time basis for central control of excess air ratio, internal combustion temperatures, and other fuel injection parameters since the light spectra from free radical combustion components are correlated with combustion efficiency. This sensor enables the implementation of a superior exhaust gas recirculation (EGR) control system that reduces emissions and increases fuel economy. The key features of invention for the transducer assembly are identified as using a low-cost technology, having high-temperature operational compatibility, and achieving long-term reliability. A low-cost system is proposed which combines a high-temperature GAP photodiode with a silicon-on-insulator (SOI) amplifier for in-cylinder measurements of the combustion signal.

BRIEF DESCRIPTION OF DRAWINGS

The present invention will be more fully understood from the accompanying drawings that include the preferred embodiment of the invention, which should not be taken to limit the invention to the specific embodiment, but are for explanation and understanding only.

The following drawings are presented to describe the salient features that provide the basis for the invention and one embodiment of the invention.

DETAILED DESCRIPTION OF INVENTION

Figure 7:
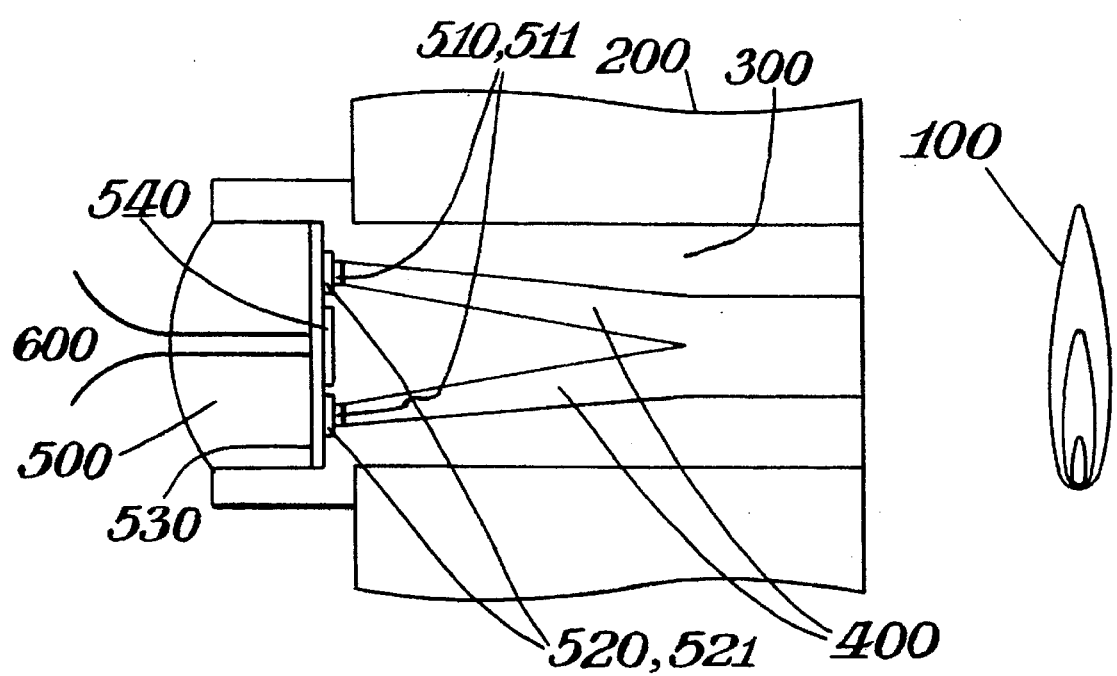
FIG. 7 illustrates, schematically, a cross-section of one possible configuration of the subject invention in the combustion chamber.

A preferred embodiment of the invention is illustrated as an article of manufacture, designed for long-term operation up to 300° C., in FIG. 7. The cylinder or spark plug wall 200 is fitted with a pressure housing 300 that encapsulates the optical fibers 400 that are utilized to direct the light from the combustion flame 100 to the signal processing module 500. The signal processing module is comprised of four components: two spectral absorption filters 510 and 511, two gallium phosphide detectors 520 and 521, and a SOI integrated circuit 540, all of which are attached to a ceramic header 530. The electrical termination of the signal processing module 500 consists of wires 600 contained within a wiring harness, and that are compatible with standard interconnection to electronics operating at lower temperatures.

The key components of the invention, schematically illustrated in FIG. 7 are: 1) high-temperature, embedded photodiodes 520 and 521 comprised of the correct semiconductor material such that the bandgap of the semiconductor device is optimal for the high-temperature conversion of optical signals from the combustion process 100 to electrical signals. 2) the use of absorption filters 510 and 511 combined with device tailored spectral response to attain high selectivity of the photodiode device 520, 521 to particular wavelength ranges corresponding to combustion control variables and also having the characteristics of a high transmission and low drift due to temperature variations, and 3) the use of an embedded high-temperature preamplifier circuit 540 to transmit the electrical signal produced by the photodiode elements 520 and 521 across the required connector gaps in the engine between the point of data acquisition and data processing.

Figure 1:
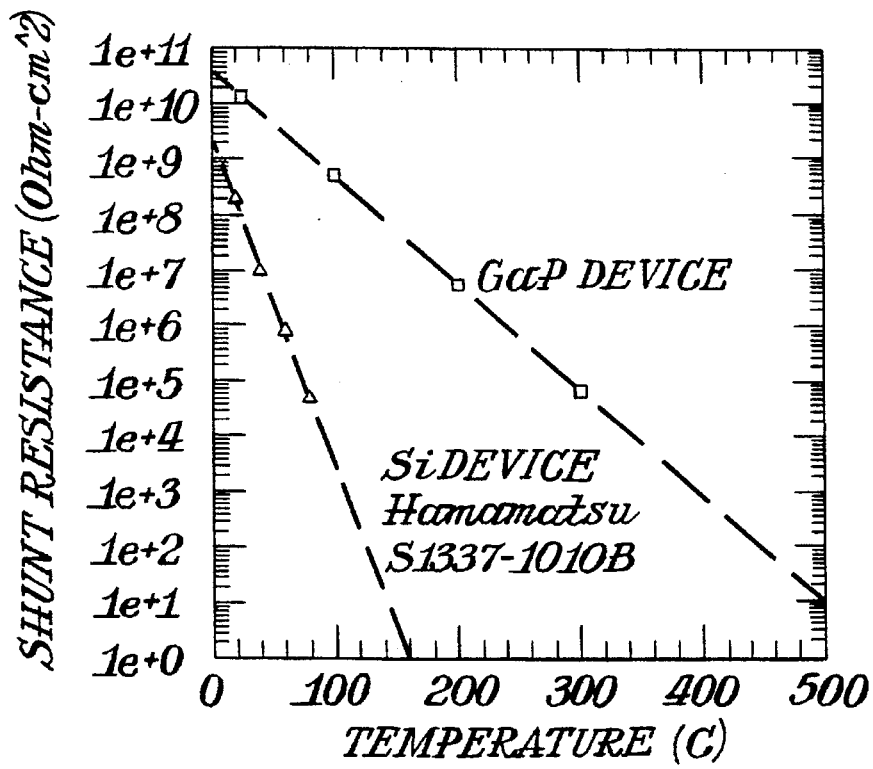
FIG. 1 is a graph showing the relationship between sensor diode specific shunt resistance and temperature for materials with differing bandgaps.
Figure 2:
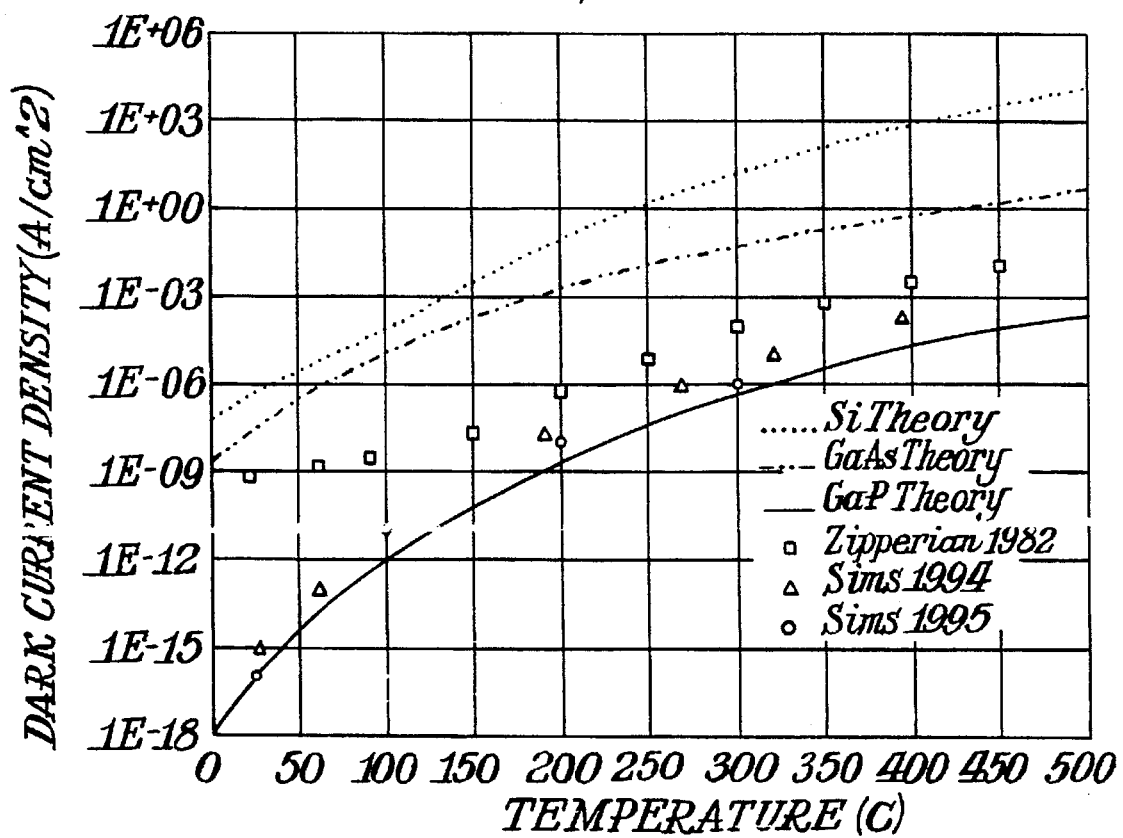
FIG. 2 is a graph showing the relationship between sensor diode dark current density and temperature for several materials.
Figure 3:
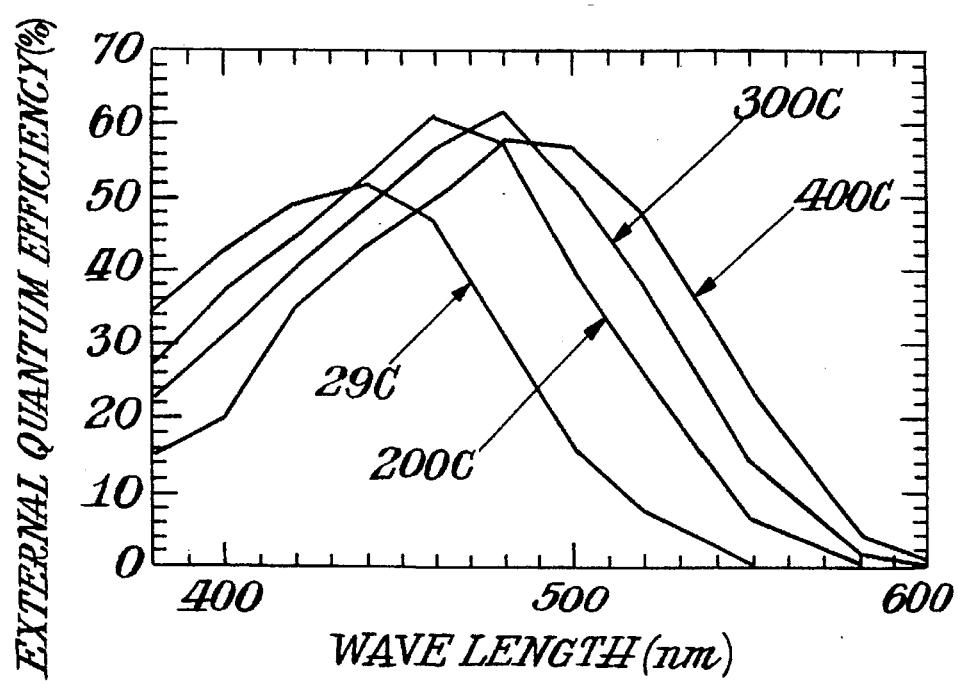
FIG. 3 is a graph showing the measurement of the external efficiency of a gallium phosphide photodiode as a function of excitation wavelength at several different temperatures.
Figure 4B:
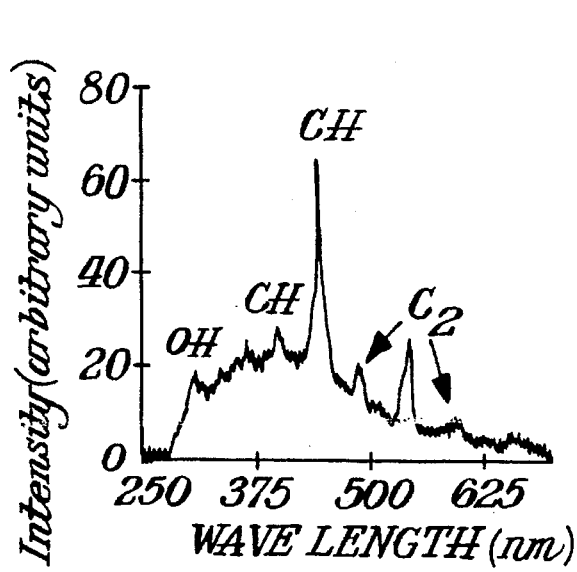
FIG. 4 are graphs showing the relationship between the intensity and wavelength the of light generated from (a) the spark process, and (b) a well-developed flame.
Figure 4A:
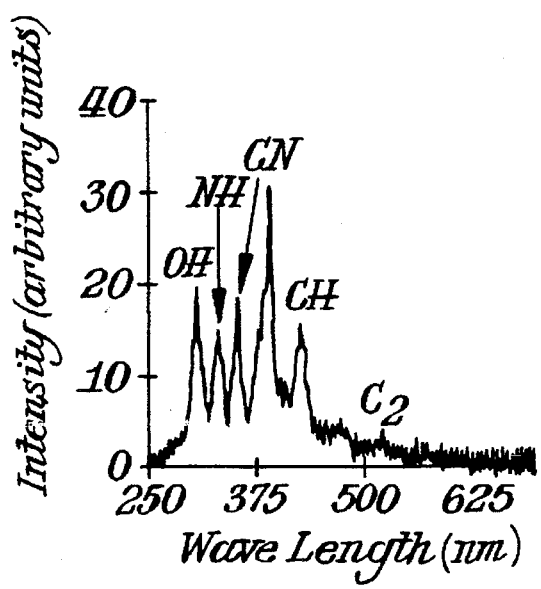
Figure 5:
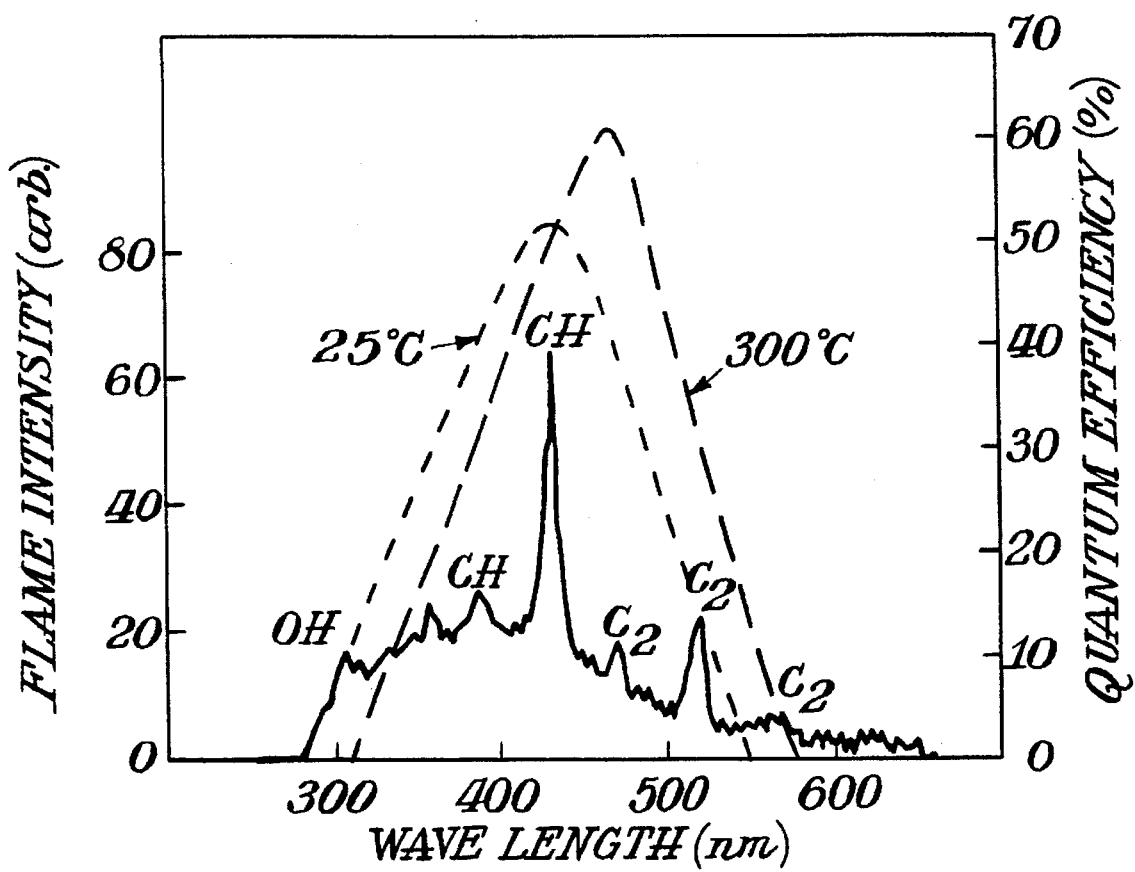
FIG. 5 is a graph showing the relationship between the intensity and wavelength of the light from a gasoline flame, and in superposition, the spectral response of two gallium phosphide photodiodes, one operating at 25° C. and one operating operating at 300° C.

FIG. 3 displays the measured quantum efficiency of a gallium phosphide photodiode device, 520 and 521, operating at 25, 100, 200, 300, and 400° C. FIGS. 4(a) and 4(b) display the spectral signature of a gasoline engine (a) during the spark process, and (b) from a well-developed flame. FIG. 5 shows the superposition of the spectral signature of a gasoline flame 100 in an internal combustion engine and the spectral response of a gallium phosphide photodiode 520, 521 operated at 25° C. and also for a gallium phosphide photodiode operated at 300° C.

A further embodiment of this invention is the incorporation of optical absorption filter elements, 510 and 511, which selectively attenuate and transmit particular wavelengths of light such that with a plurality of absorption filter elements in combination with a plurality of photodiodes with bandgap near 2.26 eV, it is possible to separate the optical signal due to the combustion process into a plurality of electrical signals which are indicative of the stoichiometry of the combustion mixture, as disclosed in U.S. Pat. Nos. 4,444, 169, 5,186,146, and Re. 034211.

Figure 6:
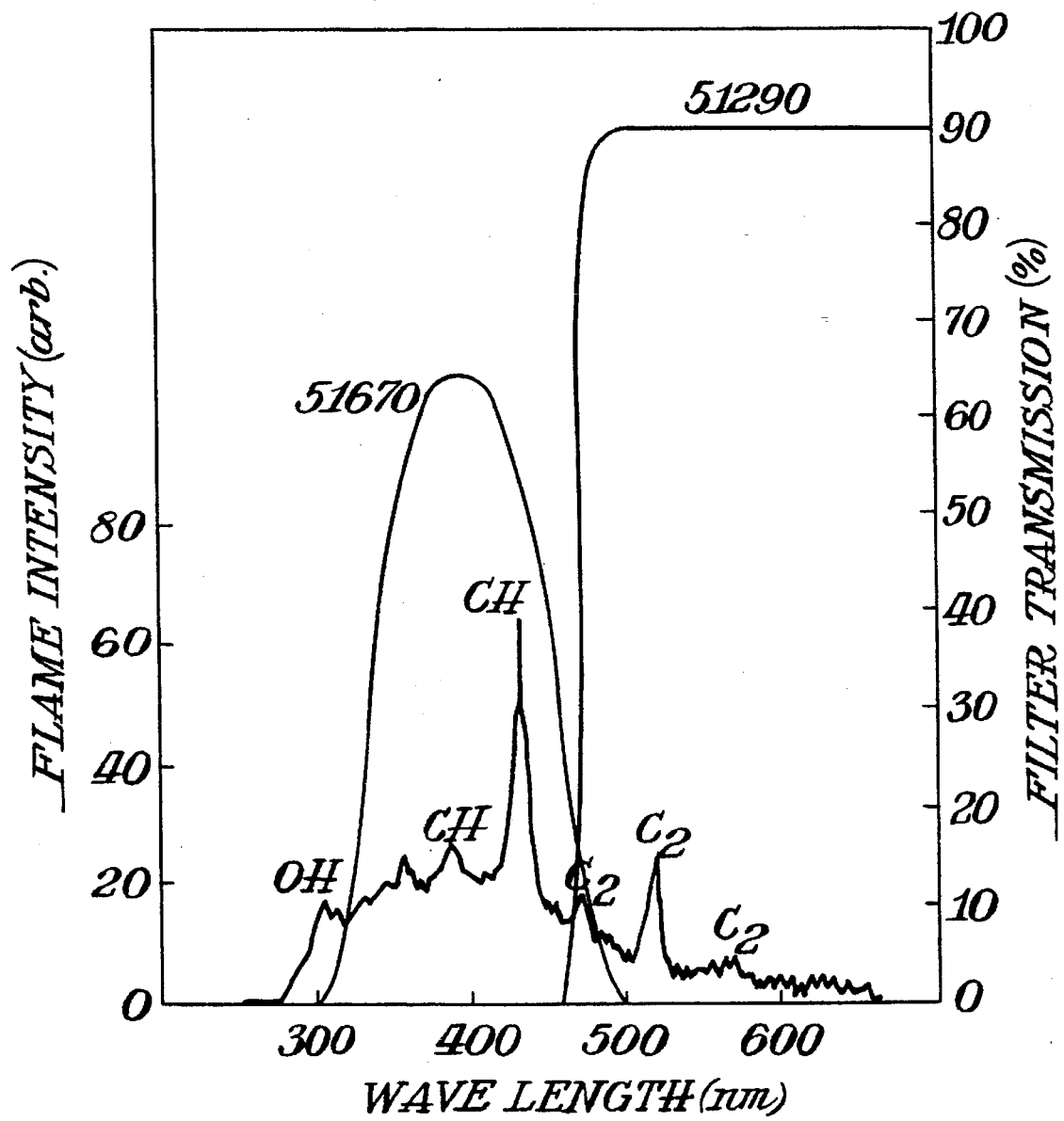
FIG. 6 is a graph showing the relationship between the intensity and wavelength of the light from a gasoline flame, and in superposition, the spectral sensitivity of two light filters (#51290 and #51670) that isolate two peaks in the flame spectrum.

FIG. 6 discloses such an embodiment where the combination of the spectral response disclosed in FIGS. 3 and 5 with the transmission characteristics with commercially available glass filters part numbers 51290 and 51670 from the Oriel Corporation, that can be employed as the optical absorption filter elements 510 and 511, to separate the optical signals due to chemiluminescence of the CH and C2 radical disassociation. This method of spectral differentiation is superior to the use of either interference filters or diffractive grating elements. The low transmission, temperature drift and physical instability of interference filters makes the practical implementation of interference filters difficult in a engine compartment. Diffractive gratings are also not feasible due to spatial considerations. The method disclosed above is the one with the best thermal drift and transmission characteristics.

What is claimed is:

1. A high-temperature optical combustion chamber sensor capable of operation up to 300° C. comprising a housing, optical elements within said housing to direct light from a combustion flame to a signal processing module, said signal processing module including at least one high-temperature embedded photodiode made of a semiconductor material having a bandgap which is substantially optimal for the high-temperature conversion of optical signals to electrical signals, said signal processing module further including at least one absorption filter for having a spectral response to attain high selectivity of said photodiode for wavelength ranges corresponding to combustion control variables and having the characteristics of a high transmission and low drift due to temperature variations, and said signal processing module further including an embedded high temperature preamplifier circuit for transmitting the electrical signal produced by said photodiode through the wiring harness in an engine between the point of data acquisition and data processing.

2. The sensor of claim 1 wherein said at least one photodiode comprises a plurality of photodiodes.

3. The sensor of claim 2 wherein said at least one absorption filter comprises a plurality of absorption filters.

4. The sensor of claim 3 wherein said photodiodes are made of gallium phosphide.

5. The sensor of claim 4 wherein said housing is a pressure housing mounted within a spark plug wall, and said optical elements are optical fibers.

6. The sensor of claim 5 wherein said photodiodes and said filters and said circuit are attached to a ceramic header.

7. The sensor of claim 6 wherein said optical absorption filters selectively attenuate and transmit particular wavelengths of light such that a plurality of said filters in combination with said photodiodes with a bandgap near 2.26 eV permit the separation of the optical signal due to the combustion process into a plurality of electrical signals which are significant measures of engine performance.

8. The sensor of claim 7 where the electrical signals are indicative of the stoichiometry of the combustion mixture.

9. The sensor of claim 7 where the electrical signals are indicative of misfires.

10. The sensor of claim 3 wherein said optical absorption filters selectively attenuate and transmit particular wavelengths of light such that a plurality of said filters in combination with said photodiodes with a bandgap in the range of 2.1 to 2.5 eV permit the separation of the optical signal due to the combustion process into a plurality of electrical signals which are significant measures of engine performance.

11. The sensor of claim 10 where the electrical signals are indicative of the stoichiometry of the combustion mixture.

12. The sensor of claim 10 where the electrical signals are indicative of misfires.

13. The sensor of claim 3 wherein said photodiodes are made of 3C-SiC or CdS, or specific compositions of InGaN or AlInGaN.

14. The sensor of claim 3 wherein said housing is a pressure mounted housing within the cylinder wall and said optical elements are optical waveguides.

15. The sensor of claim 14 wherein said optical elements are optical fibers.

16. The sensor of claim 3 wherein said housing is a pressure mounted housing within a gas turbine engine wall and said optical elements are optical waveguides.

17. The sensors of claim 16 wherein said optical elements are optical fibers.

* * * * *